Figures 1, 2:
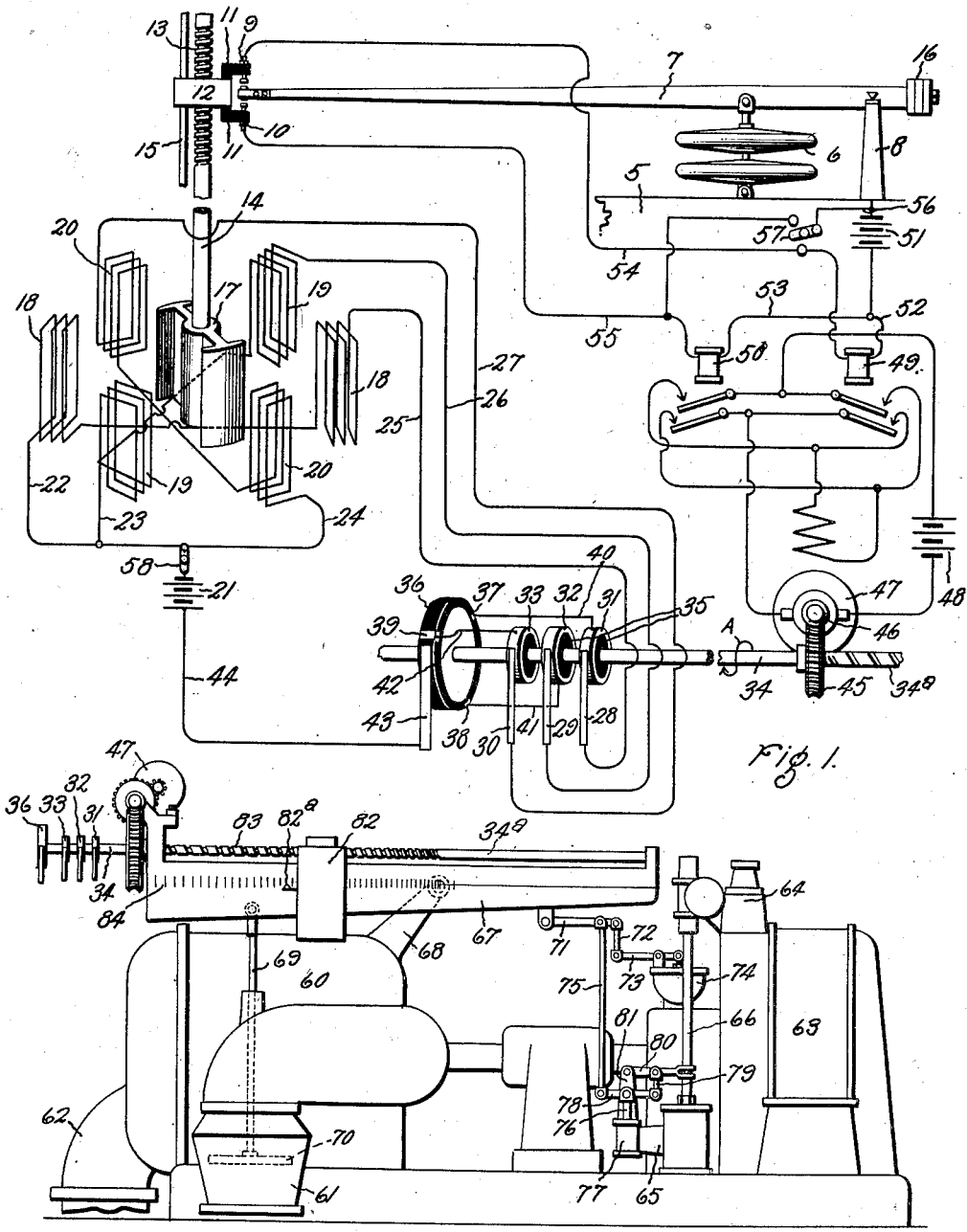

Aug. 18, 1925.

B. L. SPAIN 1,550,184

VOLUME CORRECTOR

Filed April 12, 1922

Inventor:
Batt L. Spain, by

His Attorney,

Patented Aug. 18, 1925.

1,550,184

UNITED STATES PATENT OFFICE.

BATT L. SPAIN, OF SCHENECTADY, NEW YORK, ASSIGNOR TO GENERAL ELECTRIC COMPANY, A CORPORATION OF NEW YORK.

VOLUME CORRECTOR.

Application filed April 12, 1922. Serial No. 552,042.

*To all whom it may concern:*

Be it known that I, BATT L. SPAIN, a citizen of the United States, residing at Schenectady, in the county of Schenectady, State of New York, have invented certain new and useful Improvements in Volume Correctors, of which the following is a specification.

The present invention relates to apparatus, now known as volume correctors, used to determine what volume of air or other gas under specified conditions of temperature, pressure, etc., is equivalent in weight to a given volume of air or gas under some "standard conditions" of pressure, temperature, etc. In other words, if one cubic foot of air referred to some "standard condition," as for instance, twenty nine inches of mercury barometer and sixty degrees Fahrenheit temperature, has a certain weight and, therefore, contains a definite weight of oxygen, nitrogen and other constituents, the volume corrector is used to determine what volume of air under conditions other than standard will have the same weight of air, or will contain the same weight of oxygen, nitrogen, etc.

One object of my invention is to provide an improved instrument which will operate automatically, in response to changes in conditions of the air or other gas to move an indicating pointer in a manner proportional to such changes whereby the pointer will indicate the equivalent volume of air or other gas under certain conditions which will contain the same weight of air or other gas as a given volume of air or other gas at some basic or standard conditions.

In connection with gas handling machines, such as centrifugal compressors, there is in use what are known as constant volume governors for automatically regulating the machine to deliver a constant volume of air or other gas at all times. For many applications, however, what is desired is not constant volume of air or other gas but constant weight and when a volume governor is used for delivering weight of air or other gas it will be seen that errors arise due to variations in the conditions of the air or other gas. A further object of my invention is to provide an apparatus which can be used in connection with a constant volume governor to automatically correct it for changes in conditions of the air or gas being handled.

Viewed from a slightly different aspect, a further object of my invention is to provide an improved constant weight governor, that is a governor which will automatically regulate a machine so it will deliver a constant weight of air or gas.

A further object of my invention is to provide an improved arrangement for imparting a step-by-step movement to a regulating device for a machine in response to variations in an operating condition of the machine.

For a consideration of what I believe to be novel and my invention, attention is directed to the accompanying description and the claims appended thereto.

In the drawing, Fig. 1 is a diagrammatic view of apparatus embodying my invention, and Fig. 2 shows the apparatus of Fig. 1 applied to a constant volume governor for centrifugal compressors.

In carrying out my invention, I provide a movable device, such as a sealed diaphragm, which contains air or other gas under the assumed or chosen "standard" conditions and which is subjected on its outside to the air or other gas being utilized. Variations in the conditions of the medium surrounding the movable device will effect a movement of it proportional to the amount of the variation and this movement is transmitted to a suitable mechanism for indicating volume equivalents. Furthermore, according to my invention, the movement of the movable device may be utilized directly or set to adjust the volume governing mechanism of a machine.

Referring to the drawing, 5 indicates a suitable base or support upon which is mounted a sealed movable device 6, here shown in the form of a sealed diaphragm structure. Device 6 contains a volume of air or other gas, as the case may be, under standard conditions. For example, it may contain dry air of a pressure equal to twenty-nine inches mercury barometer at sixty degrees Fahrenheit temperature. Device 6 is connected to a movable contact member or lever 7 which is pivoted at one end on a fixed post 8 and has its other end located between two spaced contacts 9 and 10. Contacts 9 and 10 are carried by insulating arms 11 fixed to a nut 12 adapted to travel on threads 13 cut on a shaft 14, the nut being guided in its movements by a post 15. Lever 7 is balanced by weights 16 so that when "standard" conditions obtain, the end of the lever stands midway between contacts 9 and 10. Shaft 14 is carried by the movable element 17 of a step-by-step electromagnetic device here shown as comprising three sets of opposed windings 18, 19 and 20, the windings of each set being connected in series. One terminal of each set of windings is connected to one side of a source of electrical energy 21, the three connections being indicated at 22, 23 and 24. The other terminals are connected by wires 25, 26 and 27 to three brushes 28, 29 and 30 which engage contact rings 31, 32 and 33. Contact rings 31, 32 and 33 are carried by a rod 34 from which they are electrically insulated as indicated at 35. On rod 34 is a ring 36 of insulating material in the periphery of which are three contacts 37, 38 and 39 spaced 120 degrees apart. Contact rings 31, 32 and 33 are connected to contacts 37, 38 and 39 by wires 40, 41 and 42. Bearing on ring 36 is a brush 43 connected by a wire 44, to source of electrical energy 21.

At one end of rod 34 is a worm wheel 45 with which meshes a worm 46 on the shaft of an electric motor 47. Motor 47 is adapted to be connected to a source of electrical energy 48 by either of two relays 49 and 50, the connections including reversing contacts, whereby when relay 49 is energized the motor will be driven in one direction and when relay 50 is energized it will be driven in the opposite direction. Relays 49 and 50 are connected on the one side to a source of electrical energy 51 by wires 52 and 53 and on the other side to contacts 9 and 10 respectively by wires 54 and 55. The other side of electrical energy supply 51 is connected by wire 56 to lever 7. At 57 is a double pole switch by means of which the circuit on either of relays 49 or 50 may be closed manually and at 58 is a switch which when opened disconnects the step-by-step electromagnetic device from the circuit-closing mechanism carried by rod 34.

With the above described arrangement when diaphragm member 6 collapses or moves downward due to the external pressure exceeding that within it, contact lever 7 is brought into engagement with contact 10, thereby closing a circuit on relay 50 by way of wire 55, relay 50, wire 53, source of electrical energy 51, and wire 56 to lever 7. Relay 50 will be energized and will pick up its armatures thus connecting motor 47 to source of electrical supply 48. The motor then will operate in a direction to turn shaft 34 in the direction indicated by arrow A, i. e., so worm wheel 45 moves downward as viewed in Fig. 1. The contact mechanism carried by shaft 34 is thus turned and when contact 37 of insulating ring 36 engages brush 43 a circuit will be closed through windings 18 by way of brush 43, wire 44, source of electrical energy 21, wire 22, windings 18, wire 25, brush 28, ring 31 and wire 40. Windings 18, being energized, will turn armature 17 through an angle of sixty degrees, threads 13 turning in a direction to cause nut 12 to travel downward to move contact 10 from engagement with arm 7. This opens the circuit on relay 50 whereupon it will be deenergized and will drop its armatures and effect an opening of the circuit which was closed on motor 47. If the diaphragm member 6 collapses further, the cycle of operation just described will be repeated, shaft 34 being given another turn of about one hundred twenty degrees in the same direction. On the other hand, when diaphragm member 6 expands or moves upward, lever 7 engages contact 9 which closes a circuit on relay 49 by way of wire 54, relay 49, wire 52, source of electrical energy 51, wire 56 and lever 7. Relay 49 will be energized and will pick up its armatures thus connecting motor 47 to source of electrical energy 48 to operate the motor when relay 50 was energized. The contact mechanism carried by rod 34 is thus turned in a direction opposite to that indicated by arrow A and after about a quarter turn will close a circuit through the step-by-step mechanism to cause armature 17 to turn through an angle of sixty degrees in a direction to drive nut 12 upward to bring contact 9 from engagement with lever 7. For example, if the parts are in the positions shown in Fig. 1, the turning of rod 34 will continue until contact 38 in insulating ring 36 reaches brush 43 whereupon a circuit will be closed from contact 38 to brush 43, wire 44, source of electrical energy 21, wire 23, windings 19, wire 26, brush 29, contact ring 32, and wire 41 to contact 38. Winding 19 will be energized and will turn armature 17 through an angle of sixty degrees in a direction to move nut 12 upward and contact 9 from engagement with lever 7. This breaks the circuit on relay 49 which drops its armatures thus opening the circuit on motor 47.

It will be seen from the foregoing that I provide a mechanism responsive to changes in the conditions of the medium surrounding the member 6 whereby variations in such conditions will effect a step-by-step turning movement of shaft 34. In the present instance, I have shown three sets of coils in the step-by-step mechanism so movements of about sixty degrees take place. It will be understood, however, that the number of sets of coils may be moved so that the movement for each step may be either greater or lesser than this amount as found desirable.

Movement of movable member 6 and hence of pointer 7 and shaft 34 are proportional to changes in the conditions of the medium surrounding member 6 and these movements may be utilized in connection with a suitable scale to indicate equivalent volumes, or they may be utilized to operate a mechanism which it is desired to actuate in accordance with such changes, or both.

In the present instance, I have shown the mechanism described above used in connection with a constant volume governor for a centrifugal air compressor this being an important application of my invention. As is well known, such a governing mechanism operates to cause the compressor to deliver continuously a constant volume of air. However, for many applications, such as blast furnace blowing, for example, it is not a definite volume of air which it is desired to supply, but a definite weight of air (or of oxygen) and in such machines the volume is taken as indicative of the weight. But the weight of air in a definite volume varies with the pressure, temperature, etc. and my invention when applied to such a governing mechanism corrects for such variations so that the volume governor will cause the compressor to deliver continuously a volume of air having a definite weight.

Referring to Fig. 2, 60 indicates a centrifugal compressor having an inlet conduit 61 and a discharge conduit 62. It is shown as being driven by a steam turbine 63. The valve mechanism controlling the admission of steam to the turbine is indicated at 64, and a fluid-actuated motor for operating the valve mechanism is indicated at 65. The valve mechanism and fluid-actuated motor may be of any suitable type, known arrangements being indicated diagrammatically in the drawing. The piston of the fluid-actuated motor is connected to the valve mechanism by a rod 66. The turbine driven compressor set is provided with a volume governing mechanism comprising a beam 67 pivotally mounted on a bracket arm 68. Connected to beam 67 adjacent one end is a rod 69 upon the lower end of which is a float 70 located in inlet conduit 61. Beam 67 is also connected to one end of a floating lever 71 the other end of which is connected by a link 72 to the governor lever 73 of a speed governor 74. At an intermediate point floating lever 71 is connected by a rod 75 to the stem 76 of the pilot valve of fluid-actuated motor 65, the pilot valve being indicated at 77. The connections of rod 75 to stem 76 preferably include a floating lever 78 to one end of which rod 75 is connected, the other end of lever 78 being connected by a link 79 to a lever arm 80 which at one end is pivotally mounted on a fixed support 81 and at the other end is pivotally and slidably connected to rod 66. This forms a well known type of follow-up connection to prevent overtravel of the governor. Mounted on beam 67 is a governor weight 82 which is adjustable along the beam. The weight has a threaded portion which meshes with threads 83 on a rod 34$^a$ so that by turning rod 34$^a$ in one direction or the other, weight 82 may be adjusted in either direction along beam 67. A calibrated scale 84 on beam 67 indicates where weight 82 should be set for the desired volume of flow, the weight carrying a pointer 82$^a$ which cooperates with the scale. Float 70 acts on beam 67 to tilt it so as to cause the fluid-actuated motor 65 to open or close the valve mechanism 64 which in turn admits more or less steam to the turbine and thereby causes such regulation of the speed of the turbine as to obtain sufficient air discharge pressure from the compressor to force the proper quantity or volume of air through the air discharge conduit of the compressor. If the weight 82 is set for a certain volume of air and less air flows past float 70, then the float 70 will lower a little thus tilting beam 67 and opening the valve mechanism 64 to admit more steam to the turbine thereby increasing the speed of the turbine. This will increase the compressor speed and hence its discharge pressure and also the volume of air delivered by the compressor. Therefore more air will pass by float 70 tending to raise the same and bring it to correct position for the volume of air desired and for which the weight 82 is set. On the other hand, if the volume of air increases, then float 70 will be raised and will tilt beam 67 in the opposite direction thus effecting a closing off of the steam supply to the turbine until the unit shall have reached a proper reduced speed for the volume of air desired.

The speed governor 74 is normally inactive, the turbine being wholly under the control of the constant volume governor, and only comes into play to take control in case of excess speed. In other words, it is somewhat of the nature of an emergency governor.

A constant volume governing mechanism as just described is of known type and the manner in which tilting of the beam effects movements of the turbine valve mechanism through the intermediary of a servo-motor or fluid-actuated motor and follow-up connections is well understood. These parts of the apparatus are accordingly shown in a more or less diagrammatic manner and are to be taken as typical of any suitable arrangement.

The scale plate 84 is laid off in dimensions representing definite volumes of air, for instance, cubic feet of free air per minute, and this represents definite weights of air when referred to some standard conditions. The scale is a quadratic scale. It will be seen that if a certain volume of air is required the weight 82 when set for that volume on scale 84 will regulate the turbine so such volume will be continuously delivered, and this volume will represent a certain definite weight of air so long as the conditions of the air remain the same. If the conditions of the air change, however, then the volume represents some other weight of air and to obtain the former weight of air, it it necessary to increase or decrease the volume as the case may be. According to my invention when applied to a centrifugal compressor, the mechanism will act to automatically adjust weight 82 so as to maintain a volume of air delivered by the compressor which will have a constant weight.

Referring to both Figs. 1 and 2, the rod 34 in Fig. 1, which is driven by motor 47, is connected directly to and forms a continuation of rod 34ª. Motor 47 and the gearing through which it drives worm wheel 45 or shaft 34 are carried directly by beam 67 and it will be clear that whenever the motor operates in response to movements of movable member 6, it will turn rods 34 and 34ª to effect an adjustment of weight 82 along beam 67.

The operation of the apparatus is as follows: As already stated, movable device 6 contains a volume of what is termed standard air. That is, it contains a volume of air such that when assumed standard air conditions obtain it will hold the end of lever arm 7 in a predetermined position. Scale 84 is laid off to represent volumes of air which when referred to assumed standard conditions represent definite weights of air. The operator first opens switch 58 and then by closing switch 57 on relay 49 or 50 operates motor 47 so as to set weight 82 for the desired volume of flow, pointer 82ª cooperating with scale 84 for this purpose. Nut 12 is adjusted to what may be considered its normal position, i. e., that position where with standard conditions obtaining the end of arm 7 will stand midway between contacts 9 and 10 as shown in Fig. 1. Switch 57 is returned to open position after weight 82 has been positioned and switch 58 is then closed. If now standard conditions obtain, the constant volume governor will cause the compressor to continuously deliver the volume of air for which weight 82 is set and this will be the desired weight of air. Movable device 6 will hold arm 7 midway between contacts 9 and 10. Should atmospheric conditions change, for example, the temperature decrease, movable member 6 will contract a certain amount pulling the end of arm 7 into engagement with contact 10. As already explained, this will close the circuit through relay 50 which will pick up its armatures and close the circuit on motor 47 so as to operate it in a direction to turn rod 34 in the direction indicated by the arrow A. This will turn threads 83 and move weight 82 toward the right in Fig. 2 which will effect a decrease in the volume of air delivered by the compressor.

As soon as rod 34 has been given a turn of about 60 degrees, the contact mechanism carried by rod 34 will come into play to close a circuit on the step-by-step mechanism and move nut 12 downward a predetermined amount. This movement may or may not bring contact 10 from engagement with the end of arm 7, depending on the amount which movable device 6 will be caused to collapse by the atmospheric change which has taken place. If it does not move contact 10 from engagement with arm 7 on the first step, then the same cycle of operation will be repeated until contact 10 is moved from engagement with the end of arm 7. In any event, the operation will take place until weight 82 has been moved to a position where the volume of air now delivered by the constant volume governor will have a weight equal to that of the volume of standard air for which the weight was originally set. On the other hand, if atmospheric conditions change so that a greater volume of air is required in order that it shall contain the desired weight of air, movable device 6 will move the end of arm 7 into engagement with contact 9, whereupon as already explained, motor 47 will be operated to turn shaft 34 in a direction opposite to that indicated by the arrow A. This will turn screw 83 in a direction to move weight 82 toward the left in Fig. 1. This sets the weight 82 for an increased volume of flow and the adjustment will be such that the new volume under the changed conditions will have a weight equal to that of the standard volume for which the weight was originally set.

As will be clear, the process of adjustment will go on continuously with changes in atmospheric conditions, the weight 82 being adjusted back and forth automatically to cause the compressor to deliver a volume having the desired weight of air.

It will be clear that the pointer 82ª will at any time indicate on the scale 84 a volume having a weight equal to the weight of the volume of standard air for which the weight 82 is set. In other words, to take a numerical example, if the weight 82 were originally set to deliver 15,000 cubic feet of free air under standard conditions, under conditions other than standard the pointer 82ª will indicate a volume having an equivalent weight; that is, it will read a volume having a weight equivalent to the standard volume. By observing the reading of pointer 82ª other compressors or other apparatus may be set accordingly to correct for volume. The apparatus thus serves as an indicating instrument to indicate volume corrections.

The movements of movable member 6 do not bear a straight line relation to the movements required for weight 82 and it is accordingly necessary to introduce at some point in the mechanism between the movable member 6 and weight 82 a differential mechanism whereby movements of member 6 will effect correct movements of weight 82. Various arrangements may be used for this purpose. In the present instance I have obtained this result by cutting the threads of screw 83 of varying pitch so that equal movements of rod 34 will effect the required adjustments of weight 82.

In the present instance the apparatus corrects for variation in temperature and pressure only and does not take into account variations due to humidity, the error due to changes in humidity being so small as to be of little moment for most commercial applications. However, it will be understood that by suitable arrangements the underlying principle of my invention may be utilized to correct for any conditions met with.

It will furthermore be understood that the specific arrangement for transmitting movement from sealed diaphragm 6 to the governing mechanism may find applications in governing arrangements other than the specific one in which it is illustrated.

In acordance with the provisions of the Patent Statutes I have described the principle of operation of my invention together with the apparatus which I now believe to represent the best embodiment thereof, but I desire to have it understood that the apparatus shown is only illustrative and that the invention may be carried out by other means.

What I claim as new and desire to secure by Letters Patent of the United States, is:

1. The combination with a compressor having a volume governor comprising a beam and an adjustable weight thereon, which may be set to cause the compressor to deliver a definite volume of fluid which represents a definite weight under standard conditions, of a sealed, expansible chamber containing standard fluid, means for adjusting said weight, and connecting means between said chamber and adjusting means for effecting adjustments of said weight in accordance with variations from standard conditions of said fluid.

2. The combination with a compressor, a prime mover for driving it, and means for regulating the prime mover comprising a movable element, of a member responsive to an operating condition of the compressor, a step-by-step mechanism for transmitting movements from the member to the movable element, said mechanism comprising a contact moved by the member, spaced contacts adapted to be engaged by it, a motor for moving said movable element, circuits including said motor, and contacts and switch mechanism for opening said circuit after a predetermined movement has taken place.

3. The combination with a compressor, a prime mover for driving it, and means for regulating the prime mover comprising a movable element, of a member responsive to an operating condition of the compressor, a step-by-step mechanism for transmitting movements from the member to the movable element, said mechanism comprising a contact moved by the member, spaced contacts adapted to be engaged by it, a motor for moving said movable element, circuits including said motor and contacts, switch mechanism for opening said circuits after a predetermined movement has taken place, and means for separating said contacts after a predetermined movement has taken place.

4. The combination of a centrifugal compressor, a motor for driving it, means for regulating the speed of said motor, a constant volume governor for effecting adjustment of said speed-regulating means, movable means for changing the setting of said constant volume governor, means for adjusting it manually, and means responsive to variations in a physical condition of the fluid being pumped for adjusting the constant volume governor to compensate for such variations.

5. The combination of a centrifugal compressor, a motor for driving it, means for regulating the speed of said motor, a constant volume governor for effecting adjustment of said speed-regulating means, movable means for changing the setting of said constant volume governor, means for adjusting it manually, a sealed expansible member containing a definite volume of fluid, and means connecting it to said movable means for adjusting it in response to variations in a physical condition of the fluid being pumped.

In witness whereof, I have hereunto set my hand this 11th day of April 1922.

BATT L. SPAIN.